Jan. 6, 1931.  M. F. CARR  1,787,776
SEPARABLE SNAP FASTENER ELEMENT
Filed April 18, 1928
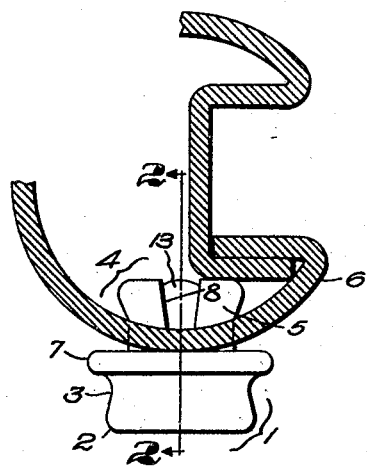
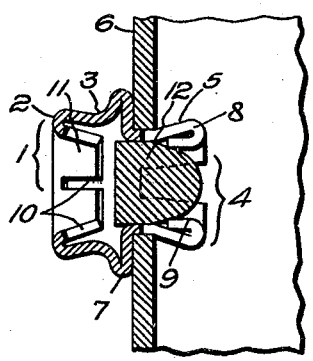 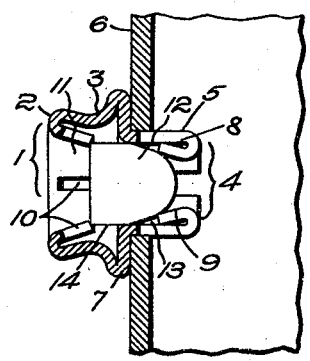
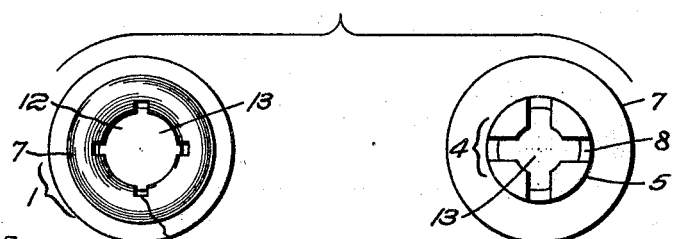
Inventor:
Moses F. Carr,
by Emery, Booth, Janney & Varney
Att'ys Patented Jan. 6, 1931

1,787,776

UNITED STATES PATENT OFFICE

MOSES F. CARR, OF LEXINGTON, MASSACHUSETTS, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

SEPARABLE SNAP-FASTENER ELEMENT

Application filed April 18, 1928. Serial No. 270,911.

My invention aims to provide improvements in separable fasteners and more particularly to fastener elements which are adapted to be secured to sheet metal structures which are inaccessible at their inner faces.

In the drawings, which illustrate a preferred embodiment of my invention:—

Figure 1 is a plan section taken through a portion of a wind shield post showing a stud secured thereto in accordance with the invention;

Fig. 2 is a section taken on the line 2—2 of Figure 1;

Fig. 3 is a section on the same line as Fig. 2 but showing the fastener before the attaching means has been expanded;

Fig. 4 includes a front elevation and a rear elevation, respectively, of the stud before attachment to a support; and Fig. 5 shows a sheet metal expanding element.

Referring to the embodiment of my invention illustrated by the drawings, I have shown a snap fastener member which is particularly, though not exclusively, adapted for attachment to a relatively thin supporting structure such as sheet metal.

The fastener member shown is provided with a hollow body portion formed from a single piece of sheet metal pressed out of the desired shape. In this instance, I have provided a socket-receiving portion 1 at one end which includes the head portion 2 and neck 3. At the other end, I have provided a tubular-shaped attaching portion 4 having an outer wall 5 which is adapted to be expanded to secure the fastener member to a support 6, as shown in Figs. 1 and 2. Between the socket-receiving portion 1 and the attaching portion 4, I have provided a flange 7 which seats against one face of the support 6.

The attaching portion is preferably divided by slits 8 so that the outer wall may be easily expanded. At the free end of the attaching portion, inwardly bent means is provided by bending inwardly the material between the slits to provide a number of tapered portions 9, as shown in Fig. 3. The slits 8 terminate short of the flange 7 where it joins the wall of the attaching portion (Figs. 2 and 3) so as to prevent the passage of dirt, water or dust when the fastener element is attached to a support, as hereinafter described.

At the outer end of the socket-receiving portion 1, the metal is bent inwardly so that it extends into the interior of the body portion and is preferably divided by slits 10 (Fig. 2) to provide a number of yieldable fingers 11 spaced from the inner wall of the body portion.

Within the fastener body, I have provided an axially movable expanding element 12 which has a tapered portion 13 and a cylindrical portion 14. This expanding element is assembled with the body of the fastener, at the point of manufacture, by simply pressing it through the opening surrounded by the fingers 11. As the opening surrounded by the fingers 11 is smaller in diameter than the cylindrical portion 14, the fingers will yield and then snap back into normal position to hold the expanding element in the body portion, as shown by Fig. 3.

The method of attachment is simple and particularly adapted for securing snap fastener elements to sheet metal objects and for use on objects such as wind shield posts (Fig. 1) the inside of which is not accessible. Furthermore, the attachment is such that only a relatively small space is required beyond the inner face of the object.

When securing a stud unit to a wind shield post, as shown in the drawings, the attaching portion 2 is passed into a pre-formed hole, as shown in Fig. 3. Then a suitable tool is pressed against the end of the expanding element, preferably in the form of a plug 12 as shown in the drawings, to move it axially toward the tapered portions 9 to expand the attaching portion beyond the inner face of the wall of the post, as shown in Figs. 1 and 2. The cylindrical portion 14 of the expanding element makes a tight fit with the inner face of the wall of the attaching portion and thereby covers the slits 8 to prevent passage of water, dust or dirt through the fastener to the inside of the post.

By making the attaching portion 4 somewhat resilient it is not necessary to form accurate holes in the objects to which the fastener elements are to be attached. This, of course, is a desirable advantage because it allows for substantial manufacturing tolerances.

The expanding element 12 shown in Figs. 1, 2 and 3 is made of solid stock, but it may be made of sheet metal (Fig. 5) and be just as effective as the solid one.

If at any time it becomes necessary to remove a fastener element, attached to a support in the above-described manner, it is only necessary to force the expanding element all the way through the attaching portion 4 until it falls out. Then as the tapered portions 9 are no longer back-supported they may yield and permit withdrawal of the attaching portion from engagement with the support.

While I have illustrated and described preferred embodiments of the invention, I do not wish to be limited thereto, therefore reference should be made to the following claims to indicate the scope of my invention.

Claims:

1. A fastener stud having a hollow body portion provided with a socket-receiving portion at one end, an expansible attaching portion at the other end divided by a number of slots, a base flange between the said portions, means providing a normally open passage in the outer end of said socket-receiving portion and axially movable expanding means normally assembled within the body portion, said expanding means being normally exposed through the passage in the socket-receiving part and adapted to be moved to expand said attaching portion by inserting a tool through the said opening in the socket-receiving portion, and said axially movable member having an annular wall engaging the inner surface of the wall of the expansible attaching portion to close the said slots against passage of dust, dirt or water.

2. A fastener stud having a socket-receiving portion 1, an attaching portion 4 for securing the stud to a support, an expanding element 12 assembled within the fastener stud for expanding the attaching portion 4 and making the stud water-tight and dust proof and yieldable means 11 holding the expanding element 12 in assembly with the fastener stud at one end thereof.

3. A snap fastener member having a portion for engagement with a cooperating snap fastener member, an aperture formed in said engaging portion, an attaching portion extending from said engaging portion for securing the snap fastener member to a supporting structure, an axially movable expanding element assembled within the fastener member for expanding the attaching portion, said expanding element having means for making the stud water-tight and dust proof, and yieldable means surrounding the aperture in the fastener-engaging portion for holding the expanding element in assembly with the fastener member after it has been forced through said aperture.

In testimony whereof, I have signed my name to this specification.

MOSES F. CARR.